United States Patent
Aboul-Magd et al.

(10) Patent No.: US 12,349,132 B2
(45) Date of Patent: Jul. 1, 2025

(54) SYSTEMS AND METHODS FOR PROVIDING A LOW DELAY SERVICE IN A WIRELESS LOCAL AREA NETWORK (WLAN)

(71) Applicant: HUAWEI TECHNOLOGIES CO., LTD., Shenzhen (CN)

(72) Inventors: Osama Aboul-Magd, Kanata (CA); Jung Hoon Suh, Kanata (CA); Yan Xin, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/969,437

(22) Filed: Oct. 19, 2022

(65) Prior Publication Data

US 2024/0137931 A1 Apr. 25, 2024
US 2024/0236976 A9 Jul. 11, 2024

(51) Int. Cl.
*H04W 72/1268* (2023.01)
*H04W 84/12* (2009.01)

(52) U.S. Cl.
CPC ........ *H04W 72/1268* (2013.01); *H04W 84/12* (2013.01)

(58) Field of Classification Search
CPC ......... H04W 72/1268; H04W 72/1263; H04W 84/12
See application file for complete search history.

(56) References Cited

U.S. PATENT DOCUMENTS

| | | | |
|---|---|---|---|
| 6,477,168 B1 * | 11/2002 | Delp | H04L 9/40 370/412 |
| 2003/0016770 A1 * | 1/2003 | Trans | H04B 3/32 375/346 |
| 2008/0068997 A1 * | 3/2008 | Krause | H04N 21/262 370/232 |
| 2012/0008572 A1 | 1/2012 | Gong et al. | |
| 2012/0250678 A1 * | 10/2012 | Sabella | H04L 47/283 370/352 |
| 2015/0257024 A1 * | 9/2015 | Baid | H04W 76/22 370/338 |

FOREIGN PATENT DOCUMENTS

| | | | | |
|---|---|---|---|---|
| EP | 3439253 A1 * | 2/2019 | | H04L 47/50 |
| EP | 3648417 A1 * | 5/2020 | | F41G 3/02 |

OTHER PUBLICATIONS

Hei et al, "The Earliest Deadline First Scheduling with Active Buffer Management for Real-Time Traffic in the Internet", Lecture Notes in Computer Science, 1st International Conference on Networking, vol. 2093, Jan. 2001 (Year: 2001).*

(Continued)

*Primary Examiner* — Kenny S Lin

(57) ABSTRACT

A method for an access point to schedule obtaining frames from stations connected thereto is provided. Real-time applications provide frames and frame due dates to the stations. The frames and their due dates are stored in respective buffers of the stations. Each station identifies the earliest due date of all its buffered frames and provides the earliest due date to the access point. The access point orders the due dates and schedules the stations according to the order of the due dates. The access point then communicates with the stations according to the schedule and obtains the frames. A WLAN system implementing the method is also provided.

26 Claims, 5 Drawing Sheets

(56) References Cited

OTHER PUBLICATIONS

Shiao-Li Tsao, "Extending earliest-due-date scheduling algorithms for wireless networks with location-dependent errors," Vehicular Technology Conference Fall 2000. IEEE VTS Fall VTC2000. 52nd Vehicular Technology Conference (Cat. No.00CH37152), Boston , MA, USA, 2000, pp. 223-228 vol. 1 (Year: 2000).*
Keng-Hoe Teh, Peng-Yong Kong and Shengming Jiang, "Proactive earliest due-date scheduling in wireless packet networks," International Conference on Communication Technology Proceedings, 2003. ICCT 2003., Beijing, China, 2003, pp. 816-820 vol. 2 (Year: 2003).*
IEEE P802.11be—IEEE P802.11be™/D4.0 Draft Standard for Information technology—Telecommunications and Information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), Jul. 2023.
Distributed Scheduling Based on Due Dates and Buffer Prioritization, IEEE Transactions on Automatic Control, vol. 36. No. 12, Dec. 1991.
IEEE Std 802.11ax—IEEE Standard for Information Technology—Telecommunications and Information Exchange between Systems—Local and Metropolitan Area Networks—Specific Requirements, Part 11: Wireless LAN Medium Access Control, (MAC) and Physical Layer (PHY) Specifications, Amendment 1: Enhancements for High-Efficiency WLAN, 2021.

* cited by examiner

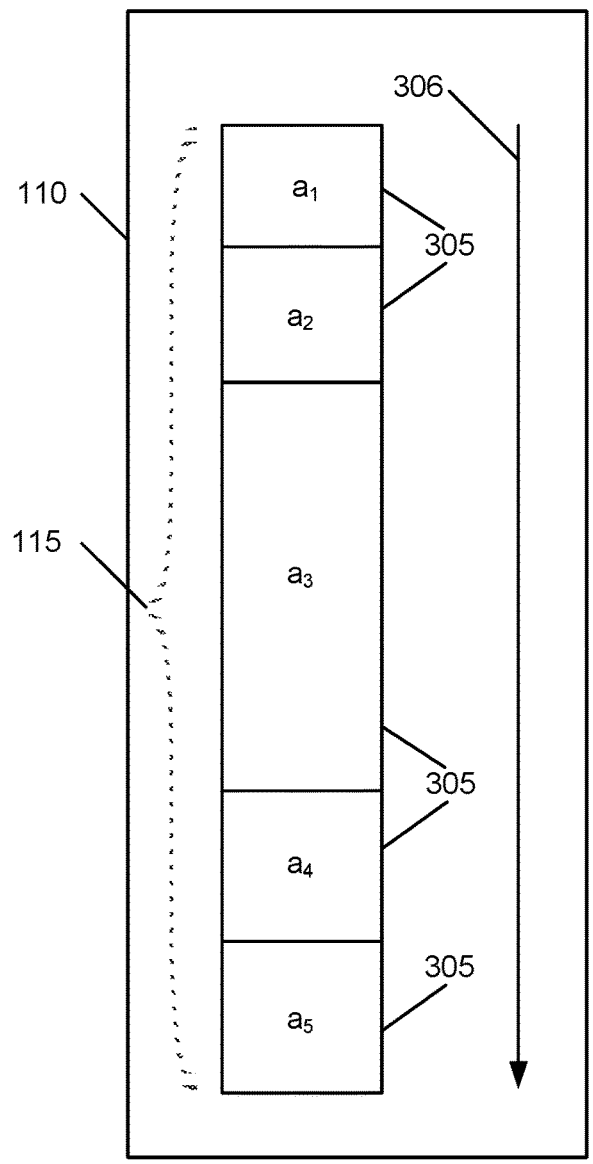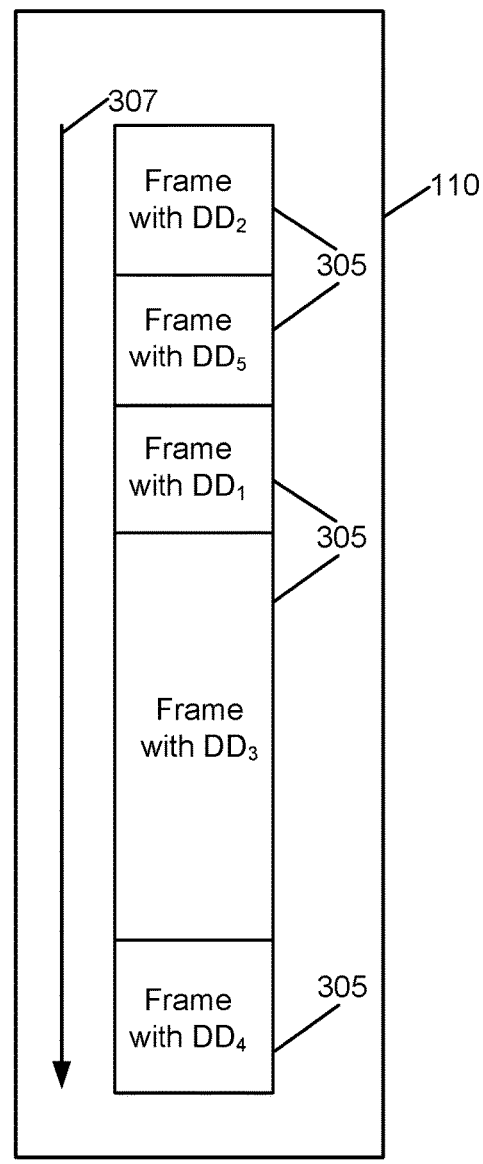
Fig. 3A
Fig. 3B

SYSTEMS AND METHODS FOR PROVIDING A LOW DELAY SERVICE IN A WIRELESS LOCAL AREA NETWORK (WLAN)

CROSS-REFERENCE TO RELATED APPLICATIONS

This is the first application filed for the present invention.

TECHNICAL FIELD OF THE INVENTION

This invention pertains generally to frames in a wireless local area network (WLAN) and in particular to methods and systems to schedule frames received at stations and an access point.

BACKGROUND

In an infrastructure mode, as opposed to an ad hoc mode, a wireless local area network (WLAN) is a network of stations (STA) managed centrally by an access point (AP). Such WLANs are not currently able to satisfy real-time applications having low delay requirements in the order of few milliseconds (ms). Such requirements are generally not met by the capability of a wireless local area network (WLAN).

The "Enhanced Distributed Channel Access" (EDCA) for example, is a distributed scheme that is managed by the STAs associated with the AP of a WLAN in an infrastructure mode. An EDCA is a random, media access mechanism that achieves statistical fairness, but it does not allow a WLAN to meet the low delay requirements of typical real-time applications. For uplinks, the 802.11 standards have also defined a trigger fame (TF) approach for controlling multiple STAs, however these are unsatisfactory for real-time applications.

The 802.11 standards also provide for scheduled access mechanisms in a WLAN. Two such mechanisms are referred to as HCCA and TWT, both of which are scheduled access mechanisms.

HCCA refers to a channel access controlled by a hybrid coordination function (HCF), i.e. an "HCF controlled channel access" (HCCA). HCCA is based on traffic parameters transmitted from a station to an access point. The access point schedules service periods (SP) for each traffic stream (TS) and for each STA. During a service period, the AP can exchange information with the station for a particular TS.

TWT refers to a "target wake time" function. In this case, a STA sets an agreement with the AP as to a time when the STA can activate and exchange information with the AP to initiate a SP. When the SP is finished, the STA can then go back into a power save mode.

A method of the prior art involves a wired network and a technique known as asynchronous transfer mode (ATM), in which a buffered packet can include an early due date (EDD) information, allowing it to be ranked with an EDD scheduler in the AP. In some cases, there can be a single buffer for each switch port of an AP. However, for a distributed environment such as a WLAN in infrastructure mode, an EDD scheduler has yet to be implemented.

For some real-time applications or services where a low packet delay is required, there is a need for systems and methods to allow a wireless local area network (WLAN) in infrastructure mode to satisfy low-delay requirements in the order of few milliseconds (ms), and such methods and systems would obviate or mitigate limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments of the present disclosure provide scheduling methods and systems where frames received at STAs of a WLAN, according to due dates (DDs) carried in the frames, and then sent to an AP where they can be scheduled based on their due dates, which represent delay requirements. In some embodiments, a DD may define a time by which the frame associated with the DD must be received by the client.

According to the present disclosure, a method can include a STA requesting, from an AP, participation in a low delay service, by sending to the AP a capability information element that includes such indication. To communicate a due date value from the STA to an AP, the due date can be carried by the PHY or the MAC header of a frame transmitted by the STA. This requires little overhead. The AP can then schedule the STA among many STAs based on the due dates received from the STAs. When scheduling the low delay STAs, the AP can use a basic access method like EDCA or TF.

According to an embodiment of the present disclosure, there is provided a method that comprises, at a station (STA) having a buffer, the STA coupled to an access point (AP), obtaining a new frame and a due date (DD) of the new frame. The method further comprises comparing the DD of the new frame against DDs of previous frames stored in the buffer, to identify the earliest DD (EDD) between the DD of the new frame and the DDs of the previous frames. A frame among the new frame and the previous frames that has the EDD may be referred to as an EDD frame. The method also comprises providing the EDD to the AP for the AP to schedule obtaining the EDD frame from the STA.

In some embodiments, providing the EDD to the AP includes, at the station: encapsulating the EDD in a MAC frame and providing the MAC frame to the AP. The MAC frame has a MAC header containing the EDD. In some embodiments, encapsulating the EDD in the MAC frame includes encapsulating the EDD in a MAC header of the MAC frame. In some embodiments, the MAC header includes a control field and the control field includes the EDD.

In some embodiments, providing the EDD to the AP includes, at the station, encapsulating the EDD in a PHY header of a PHY frame and providing the PHY frame to the AP. In some embodiments, the PHY header includes a SIG field, and the SIG field includes the EDD.

In some embodiments, the AP is configured to schedule the EDD frame in accordance with a DD scheduling process, the method further comprising, at the STA, sending to the AP a capability information element indicating to the AP a request by the STA to participate in the DD scheduling process. In some embodiments, the capability information element includes a field to indicate the request by the STA to participate in the DD scheduling process. In some embodiments, the field to indicate the participation of the STA in the DD scheduling process is a one-binary digit field.

In some embodiments, each new frame has a respective DD which is equal to an arrival time of the new frame at the buffer plus a delay parameter. In some embodiments, each new frame is generated by an application and the method further comprises, at the STA, for each new frame, defining a value of the delay parameter in accordance with at least one of: a maximum delay value set by the application that generated the new frame; an average delay value associated with the application; and a duty cycle of the application.

In some embodiments, obtaining an earliest due date (EDD) from a STA comprises obtaining from the STA a frame having a MAC header containing the EDD. In some embodiments, the MAC header includes a control field and the control field includes the EDD.

In some embodiments, obtaining an earliest due date (EDD) from a STA comprises obtaining from the STA a frame having a PHY header containing the EDD. In some embodiments, the PHY header includes a SIG field and the SIG field includes the EDD. In some embodiments, the SIG field includes an EHT-SIG field and the EHT-SIG field includes the EDD.

In some embodiments, the method further comprises obtaining a capability element that includes a field for an indicator of low delay. In some embodiments, the indicator of low delay is a one-bit digit.

In some embodiments, the DD is the sum of an arrival time of a frame to the buffer, and a delay parameter DP.

In some embodiments, the method further comprises, obtaining from the STA, a capability element that includes a field for an indicator of low delay.

According to an embodiment of the present disclosure, there is provided a method that comprises, at an access point (AP) coupled to stations (STAs), each STA having a buffer, obtaining due dates (DDs) from different STAs, each DD being associated with a respective frame, and scheduling the AP obtaining the respective frames in accordance with the DDs.

In some embodiment, obtaining the due dates from the different STAs is preceded by the AP obtaining, from each of the different STAs, a respective capability information element indicating that the respective STA is requesting to be scheduled according to the due date of the frame.

In some embodiments, obtaining the respective capability information element includes obtaining a MAC frame containing the capability information element or obtaining a PHY frame containing the capability information element.

In some embodiments, scheduling the respective frames in accordance with the due dates comprises comparing the DDs to each other to order the DDs, and scheduling the frames in accordance with an order of the DDs.

According to an embodiment of the present disclosure, there is provided a system that comprises an access point (AP) and stations (STAs) coupled to the AP. Each of the STAs having a respective buffer. Each of the STAs being configured to obtain a new frame and a due date (DD) of the new frame and to compare the DD of the new frame against DDs of previous frames stored in the buffer, to identify the earliest DD (EDD) between the DD of the new frame and the DDs of the previous frames. A frame among the new frame and the previous frames that has the EDD may be referred to as an EDD frame. Each of the STAs being configured to provide the EDD to the AP for the AP to schedule obtaining the EDD frame from the STA.

In some embodiments, the AP scheduling the EDD frame includes the AP comparing the EDD of the EDD frame with one or more other EDDs obtained from other respective STAs, and scheduling obtaining the EDD frame in accordance with the one or more other EDDs obtained from the other respective STAs.

Technical benefits of embodiments include the ability to operate real-time applications or services having low delay requirements, on a WLAN in infrastructure mode, and to assure that the low delay requirements are met, by indicating to the AP of the WLAN a requirement to participating in a low delay scheduling method, and by scheduling frames according to respective due dates.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

FIG. 3A illustrates an embodiment of a station with frames ordered according to their arrival time, in accordance with the present disclosure.

FIG. 3B illustrates an embodiment of a station with frames ordered according to their DDs, in accordance with the present disclosure.

It will be noted that throughout the appended drawings, like features may be identified by like reference numerals.

DETAILED DESCRIPTION

In the context of the present disclosure, a station (STA) may be any device configured to (capable of) receiving and transmitting wireless signals. Non-limiting examples of STAs include mobile communication devices, laptop computers equipped with wireless transmission/reception capabilities, desktop computers equipped with wireless transmission/reception capabilities, etc. Further, also in the context of the present disclosure, an access point (AP) may be any device configured to communicate with STAs via wireless signals and that is also configured to provide the STAs access to communication systems, which may be connected to the AP through wireline signals or wireless signals. Non-limiting examples of APs include hotspots, a router, etc.

Also in the context of the present disclosure, an element A can be said to be coupled to an element B when element A is configured to provide a signal (e.g., a wireless signal or an electrical signal) to element B or element B is configured to obtain the signal from element A. Element A may also be said to be coupled to an element B when a change in a parameter at element A results in a change in parameter at element B. Element A may be said to be coupled to element B when element A and element B are in communication with each other or when they are connected to each other.

A WLAN setup is said to be in an infrastructure mode when a number of STAs are associated with a single AP that controls the operation of the WLAN setup in terms of channel selection, timing, capabilities, etc. A limitation in the prior art is that such a WLAN cannot support a real-time application having low-delay (low-latency) requirements on the order of few milliseconds (ms), which is typical for some real-time applications and services.

Figure 1:
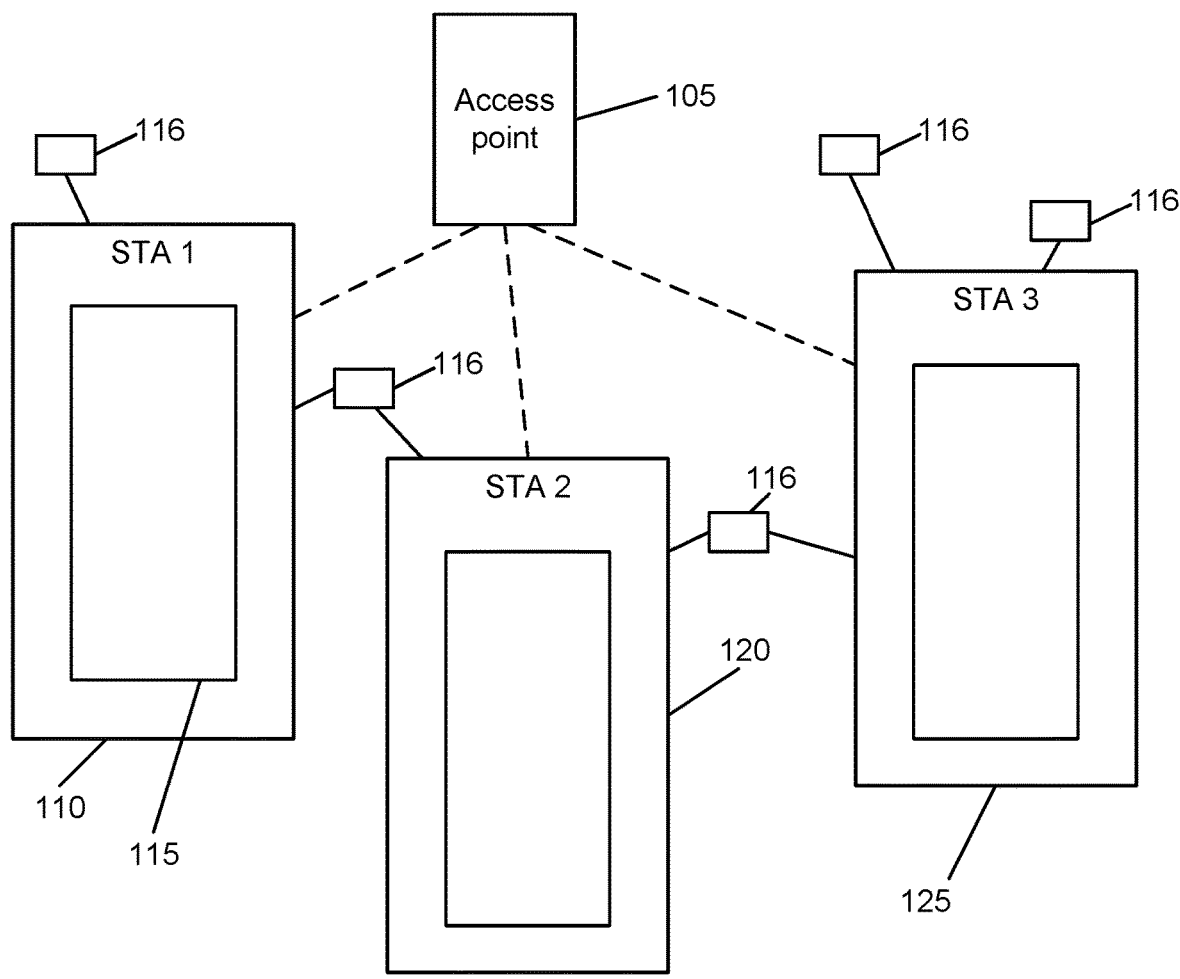
FIG. 1 illustrates an embodiment of WLAN system in accordance with the present disclosure.

FIG. 1 illustrates a WLAN system, according to an embodiment. The WLAN system comprises a basic service set (BSS) that includes the stations (STAs) STA 1 110, STA 2 120 and STA 3 125. In an infrastructure mode of the BSS, STAs such as STA 1 110, STA 2 120 and STA 3 125, are associated with a single AP 105. Each STA may be equipped with a buffer 115 configured to receive frames from applications running on the STA or from other devices that may be coupled to the STA. Each STA may be configured to request, from the AP 105, participation in a low delay service, by sending a capability information element to the AP 105, indicating the participation request to the AP 105. Whether a STA requests participation in the low delay service is a function of the type of frames the STA is to provide to the AP 105. If a frame is associated with a real-time application, then the STA receiving the frame may request the low delay service.

Therefore, each STA of the BSS, managed by the AP 105, may request to participate, or not, in the low delay service. The choice to request participation or not can be carried by a frame, which is an example of a capability information element, having a low delay request field, which can be a one-binary digit (0 or 1) field, set by the STA, such that, for example, when the low delay request field is set to zero (0), the STA is not requesting the low-delay service, and when the low delay request field is set to one (1) the STA is requesting the low-delay service.

Figure 2:
FIG. 2 illustrates a embodiment of a capability information element in accordance with the present disclosure.

FIG. 2 illustrates a capability information element 205 specifying a capability, according to an embodiment. The capability information element 205 of the present embodiment may be carried in a beacon frame, for example, in the body of the beacon frame. that the capability information element 205 may include an element ID field 210, a length field 215, a low delay field 220 (which may be set to 0 or 1), and other fields 225. The element ID field 210 and the length field 215 may be defined in 802.11 standards.

In an embodiment, each STA coupled to a same AP and participating in a low delay service has a buffer (low delay buffer) in which each frame obtained and carrying a low-delay indication can be buffered and ranked (ordered) according to a transmission due date (DD) of the frame.

Each STA may be configured to obtain, for example, from the application layer, a new frame and a DD of the new frame and store the new frame in the STA's respective buffer. The STA may be configured to compare the DD of the new frame against DDs of previous frames stored in its buffer and identify the earliest DD (EDD) between the DD of the new frame and the DDs of the previous frames. The frame among the new frame and the previous frames that has the EDD may be referred to as an EDD frame. The STA may also be configured to provide the EDD to the AP for the AP to schedule the EDD frame according to its EDD and according to other EDDs of other EDD frames buffered at other STAs coupled to the AP. The AP may be configured to schedule the frames to satisfy and assure low delay requirements of applications (real-time applications) associated with the frames.

When many frames with corresponding DDs are stored at a buffer, they can be indexed as $DD_i$, where i indicates the $i^{th}$ DD frame, from the frames obtained at the STA. After frames have been queued at their respective STA, the STA may inform the AP of the earliest of the $DD_i$ value it received from the frames. The earliest of the $DD_i$ at a station can be referred to as an EDD.

FIG. 3A illustrates a STA including a buffer for buffering frames having low delay requirements, according to an embodiment. STA 1 110, for example, may include a buffer 115 for receiving frames 305 from the application layer. In an embodiment, each frame 305 can be a low delay frame obtained at the buffer 115 and sequenced according to its time of arrival ($a_i$) at the buffer. In FIG. 3A, the frame 305 with $a_1$ is the earliest frame received at the STA 1 110; the frame 305 with $a_5$ is the latest frame received at the STA 1 110. The arrow 306 represents increasing arrival times of the frames at the buffer 115. The frames 305 may have different sizes (represented by the different heights of the frames 305). Subsequently, or simultaneously to the arrival of a frame 305 at the buffer 115, the DD for each frame 305 may be calculated and the frames 305 may be reordered according to the DDs. The DD for frame "i" may be calculated as the sum of the arrival time "$a_i$" of the frame at the STA plus a delay parameter value "$DP_i$".

$$DD_i = a_i + DP_i.$$

The delay parameter $DP_i$ may be set to a value defined by a real-time application that generated frame "i". $DP_i$ may be set in various ways, including those in the following non-limiting embodiments. In some embodiments, $DP_i$ may be set in accordance with a maximum delay value determined by the application that generated frame "i". In other embodiments, $DP_i$ may be set as an average delay value associated with the application that generated frame "i". In further embodiments, $DP_i$ may be set in accordance with a duty cycle of the application (in case of continuous bit rate traffic) that generated frame "i" or in any other suitable way. FIG. 3B shows the frames 305 reordered according to their DDs. The arrow 307 represents increasing values of the DDs. In FIG. 3B, $DD_2 = a_2 + DP_2$ is earlier than $DD_5 = a_5 + DP_5$, which is earlier than $DD_1 = a_1 + DP_1$, which is earlier than $DD_3 = a_3 + DP_3$, which is earlier than $DD_4 = a_4 + DP_4$.

In some embodiments, the DP value may set to be the same for all the frames received by a STA, within a predetermined time interval. However, in other embodiments, a DP value can be different for each application or even for each frame.

An EDD may be provided to the AP using a low overhead mechanism such as a WLAN 802.11 frame structure, wherein the EDD is encapsulated in a PHY header of a PHY frame. The PHY header can include a SIG field for including the EDD. In particular, the EDD can be included in a U-SIG field or an EHT-SIG field.

Figure 4:
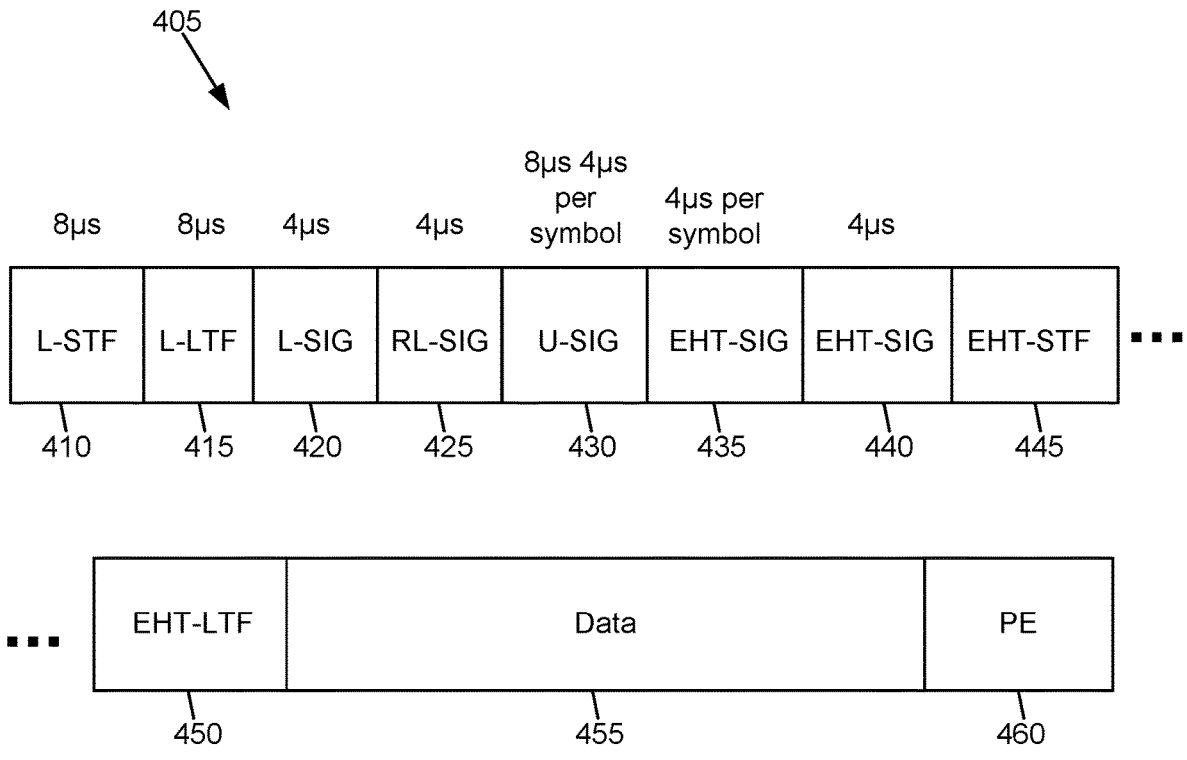
FIG. 4 illustrates an embodiment of where an EDD can be included in a PHY header of a frame in accordance with the present disclosure.

FIG. 4 illustrates an embodiment of where an EDD may be included in a PHY header of a frame, according to an embodiment of the present disclosure. A PHY frame 405 includes a plurality of headers, one of which is a U-SIG field 430, and another being an EHT-SIG field 440. Other fields characterizing the PHY frame can include a L-STF field 410, an L-LTF field 415, a L-SIG field 420, a RL-SIG field 425, an EFT-SIG field 435, an EHT-STF field 445, an EHT-LTF field 450, data 455, and a PE 460. In this embodiment, the EDD may be included in the U-SIG field or in the EHT-SIG field.

Figure 5:
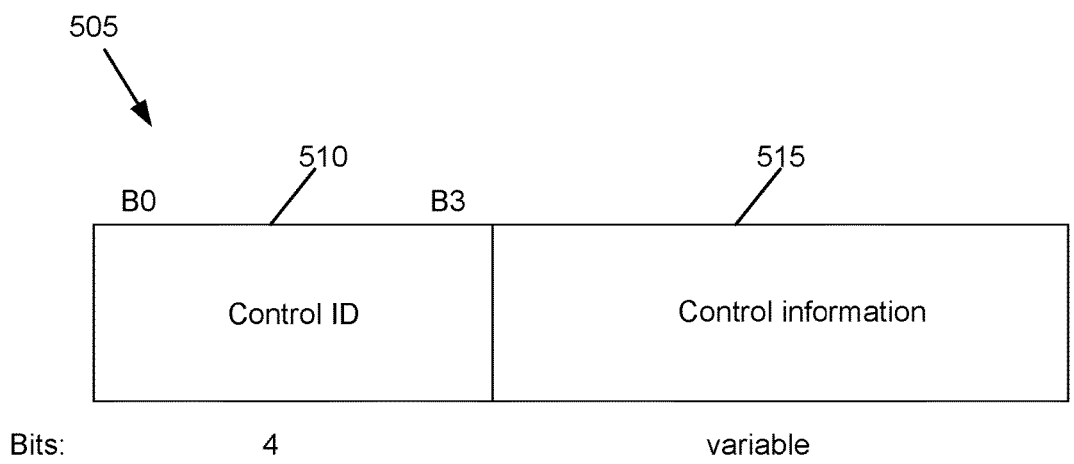
FIG. 5 illustrates an embodiment of where an EDD can be included in a MAC header of a frame in accordance with the present disclosure.

Alternatively, as shown in FIG. 5, the EDD from a STA can be encapsulated in a MAC frame having a MAC header 505 containing the EDD. The MAC header 505 can include a 4-bit control ID field 510 and a variable-length control information field 515 in which and EDD may be included. To encapsulate the EDD in the MAC frame, a method according to an embodiment of present disclosure may use a high efficiency (HE) variant of a high throughput (HT) control field in the MAC header and define a new (unused) control ID. For example, a STA may copy an EDD of a frame to be scheduled, in the HE variant of the HT control field.

Figure 6:
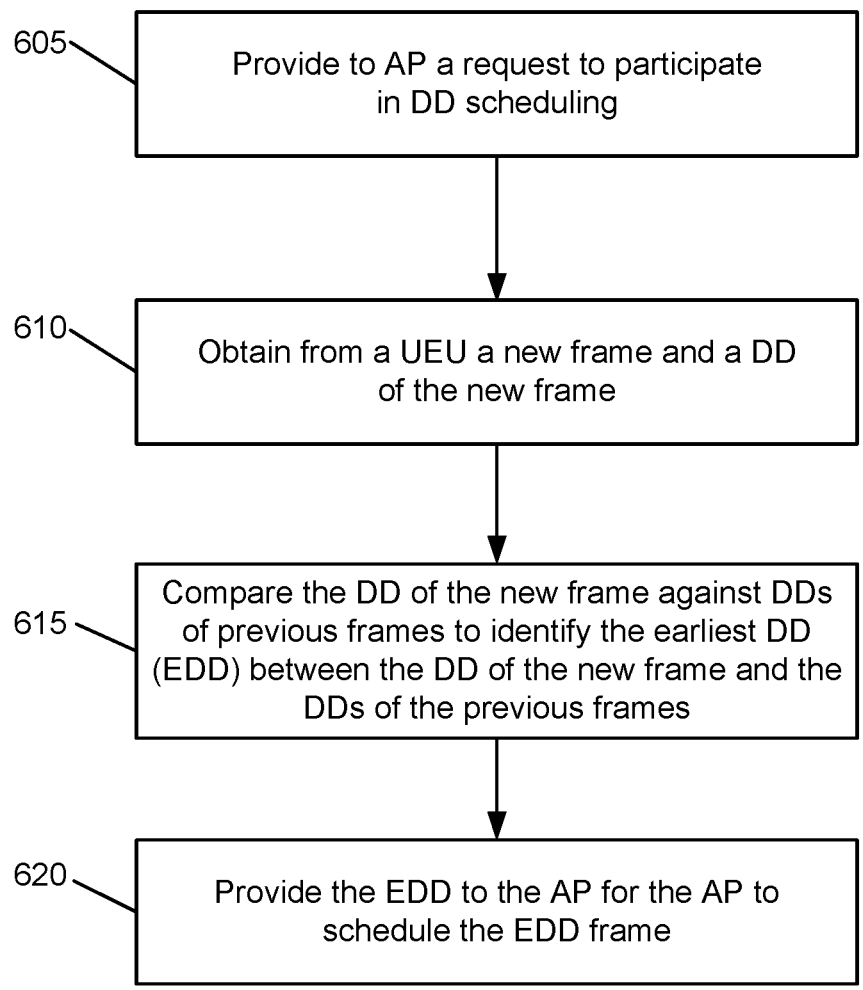
FIG. 6 is a flowchart of an embodiment of a method in accordance with the present disclosure.

FIG. 6 is a flowchart of a method of scheduling frames according to an embodiment of the present disclosure. Initially, at action 605, a STA provides (sends) to an AP a request to participate in the DD scheduling method carried out by the AP. At action 610, the STA may obtain, for example from an application running at the STA, a new frame and a due date (DD) of the new frame. At action 615, the STA may compare the DD of the new frame against DDs of previous frames stored in a buffer of the STA, to identify the earliest DD (EDD) between the DD of the new frame and the DDs of the previous frames. At action 620, the STA may provide the EDD to the AP for the AP to schedule the frame associated with the EDD. The AP may then schedule the frames associated with EDDs provided from multiple STA according to the EDDs. After scheduling the frames with the EDDs, the AP may use an access method such as EDCA, or a trigger frame method for uplink traffic.

In another embodiment, if a frame with a DD arrives at a STA when the low delay queue (buffer) of the STA is empty, the STA can transmit the DD of the frame, which is also the EDD because there are no other frames, using a quality of service (QoS) frame with no data, i.e., a null frame, using a media access mechanism such as enhanced distributed channel access (EDCA). The STA can then continue updating its EDD as frames with DDs are obtained at the STA.

In another embodiment, if the queue of low delay frames (buffer) at a STA is empty of any low delay frames, then the STA can inform the AP not to schedule any frame with the low-delay scheduling by including a specific string (e.g. a string of "1"), in the EDD field of a PHY or MAC header.

In a further embodiment, when an EDD in a STA's buffer (queue) exceeds the value of a current clock value, the STA may elect not to report this EDD to the AP, and instead report the next EDD that is less than the current clock value.

In an embodiment, a real-time traffic that is excessively delayed can be dropped at the STA and as having no play-back value.

In an embodiment, when a STA is about to provide a frame with an EDD to the AP, it can happen that a more urgent frame must be sent instead. For such cases, a STA may be configured to send the more urgent frame instead.

In an embodiment, a STA's behavior can be sufficiently flexible to manage its low delay queue appropriately, from the station's perspective.

Figure 7:
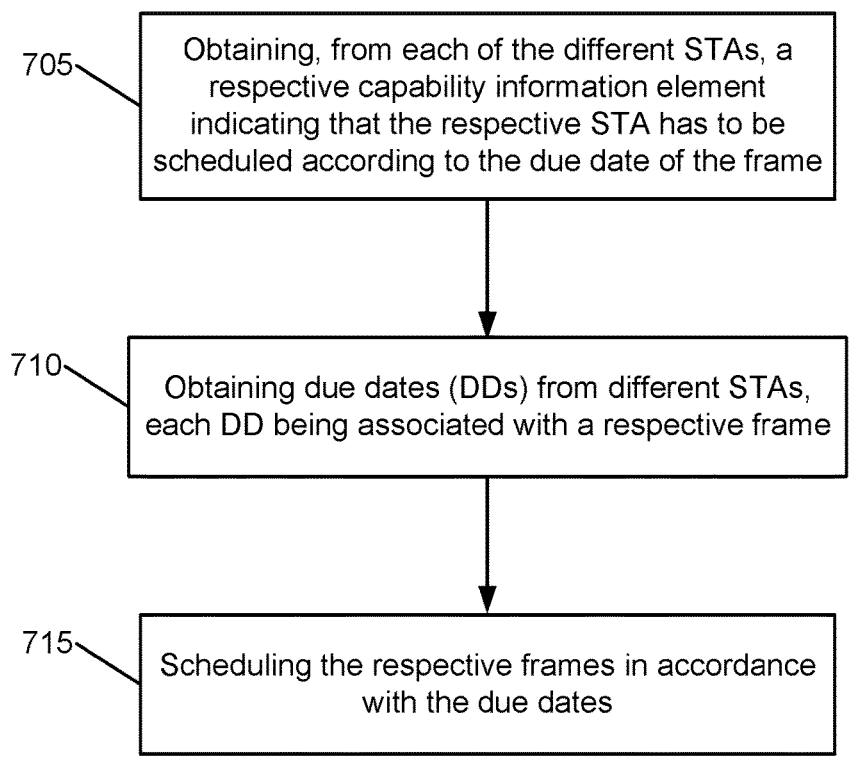
FIG. 7 is a flowchart of an embodiment of another method in accordance with the present disclosure.

FIG. 7 is a flowchart of a method of scheduling frames according to another embodiment of the present disclosure. The actions performed in the flowchart may be those of an AP coupled to stations (STAs), where each STA has a buffer. The AP may obtain DDs from the different STAs where each DD relates to a respective frame. The AP may then schedule the respective frames in accordance with the due dates. At action 705, the AP obtains from each of the different STAs, a respective capability information element indicating that the respective STA is requesting to be scheduled according to the EDD of all the respective frames at the respective STA. At action 710, the AP obtains from different STAs, each respective EDD. At action 715, the AP may schedule, in accordance with the EDDs, the frames with the EDDs from the different STAs.

Figure 8:
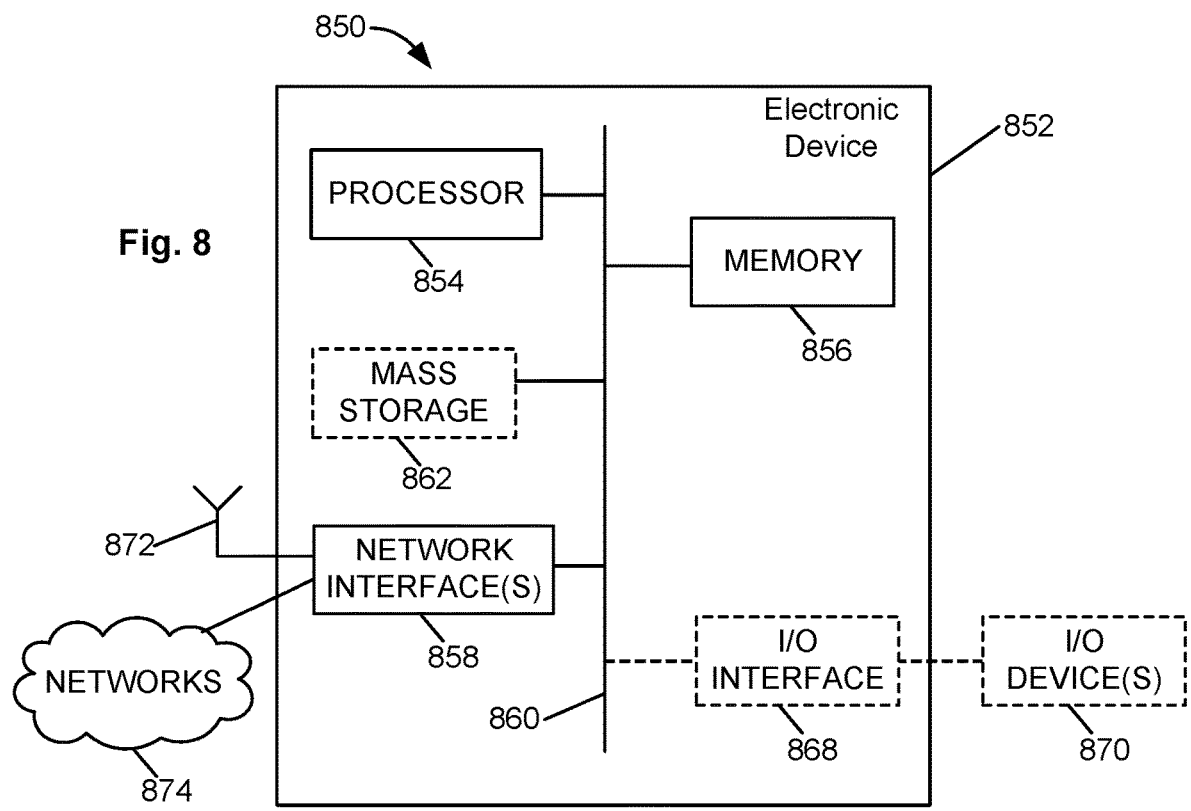
FIG. 8 is a block diagram of an embodiment of an electronic device in accordance with the present disclosure.

FIG. 8 is a block diagram of an electronic device (ED) 852 illustrated within a computing and communications environment 850 that may be used for implementing the devices and methods disclosed herein, such as a STA and an AP. The electronic device 852 typically includes a processor 854, such as a central processing unit (CPU), and may further include specialized processors such as a field programmable gate array (FPGA) or other such processor, a memory 856, a network interface 858 and a bus 860 to connect the components of ED 852. ED 852 may optionally also include components such as a mass storage device 862, a video adapter 864, and an I/O interface 868 (shown in dashed lines).

The memory 856 may comprise any type of non-transitory system memory, readable by the processor 854, such as static random-access memory (SRAM), dynamic random-access memory (DRAM), synchronous DRAM (SDRAM), read-only memory (ROM), or a combination thereof. In an embodiment, the memory 856 may include more than one type of memory, such as ROM for use at boot-up, and DRAM for program and data storage for use while executing programs. The bus 860 may be one or more of any type of several bus architectures including a memory bus or memory controller, a peripheral bus, or a video bus.

The electronic device 852 may also include one or more network interfaces 858, which may include at least one of a wired network interface and a wireless network interface. A network interface 858 may include a wired network interface to connect to a network 874, and also may include a radio access network interface 872 for connecting to other devices over a radio link. The network interfaces 858 allow the electronic device 852 to communicate with remote entities such as those connected to network 874.

The mass storage 862 may comprise any type of non-transitory storage device configured to store data, programs, and other information and to make the data, programs, and other information accessible via the bus 860. The mass storage 862 may comprise, for example, one or more of a solid-state drive, hard disk drive, a magnetic disk drive, or an optical disk drive. In some embodiments, mass storage 862 may be remote to the electronic device 852 and accessible through use of a network interface such as interface 858. In the illustrated embodiment, mass storage 862 is distinct from memory 856 where it is included and may generally perform storage tasks compatible with higher latency but may generally provide lesser or no volatility. In some embodiments, mass storage 862 may be integrated with a heterogeneous memory 856.

In an embodiment, a STA can comprise at least one processor 854 and machine readable memory 856 storing machine readable instructions which when executed by the at least one processor 854, configures the at least one processor 854 to obtain a new frame and a due date (DD) of the new frame; compare the DD of the new frame against DDs of previous frames stored in the buffer, to identify the earliest DD (EDD) between the DD of the new frame and the DDs of the previous frames, a frame among the new frame and the previous frames that has the EDD being an EDD frame; and provide the EDD to the AP for the AP to schedule the EDD frame. The network interface 874 and I/O interface 868 can also allow for storage and/or processing to occur externally.

In an embodiment, an AP can comprise at least one processor 854; a machine-readable memory 856 storing machine readable instructions which when executed by the at least one processor 854, configures the at least one processor 854 to obtain due dates (DDs) from different STAs, each DD being associated with a respective frame; and schedule the respective frames in accordance with the due dates. The network interface 874 and I/O interface 868 can also allow for storage and/or processing to occur externally.

In some embodiments, electronic device 852 may be a standalone device, while in other embodiments electronic device 852 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage, and connectivity resources (along with other resources within the network) can be divided between different sub-networks, in some cases in the form of a resource slice. If the resources across a number of connected data centers or other collection of nodes are sliced, different network slices can be created.

Advantageously, a procedure according to an embodiment of the present disclosure can help assure that low delay requirements of real time applications can be satisfied in a WLAN. Such a method or procedure can provide a mechanism to serve communication sessions with low delay requirement on a priority basis.

Advantageously, embodiments of the present disclosure allow frames with early due dates to be scheduled by an AP that has access to the EDDs of the STAs connected thereto, rather than having to predict which STAs will request a low delay.

Advantageously, according to embodiments of the present disclosure, a STA can request to participate in the low delay service offered by an AP, by sending to the AP a capability information element, instead of requiring the AP to proactively select which STAs require a low delay service.

Advantageously, embodiments of the present disclosure include a low overhead mechanism to communicate EDD values from STAs to an AP. EDD values can be encapsulated in data packet frames, using PHY or MAC headers. This allows a STA to request a low delay service from an AP using one frame or one transmission opportunity (TXOP), instead of using an additional frame or TXOP.

Advantageously, embodiments of the present disclosure allow scheduling at an AP to be based on EDD values received from STAs to allows traffic to be queued based on their delay requirements, which facilitates maintaining a quality of service (QoS).

As another advantage, when scheduling the low delay STAs according to embodiments of the present disclosure, the AP can use a basic access method such as EDCA or, for uplinks, a TF method. This may allow statistical fairness when providing QoS to all participating low delay STAs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method, comprising, at a station (STA) having a buffer, the STA coupled to an access point (AP):
   obtaining, a new frame and a due date (DD) of the new frame;
   comparing the DD of the new frame against DDs of previous frames stored in the buffer, to identify the earliest DD (EDD) between the DD of the new frame and the DDs of the previous frames, a frame among the new frame and the previous frames that has the EDD being an EDD frame; and
   providing the EDD to the AP for the AP to schedule obtaining the EDD frame from the STA.

2. The method of claim 1, wherein providing the EDD to the AP includes, at the station:
   encapsulating the EDD in a MAC frame; and
   providing the MAC frame to the AP, the MAC frame having a MAC header containing the EDD.

3. The method of claim 2, wherein encapsulating the EDD in the MAC frame includes encapsulating the EDD in a MAC header of the MAC frame.

4. The method of claim 3, wherein the MAC header includes a control field, the control field including the EDD.

5. The method of claim 1, wherein providing the EDD to the AP includes, at the station:
   encapsulating the EDD in a PHY header of a PHY frame; and
   providing the PHY frame to the AP.

6. The method of claim 5, wherein the PHY header includes a SIG field, and the SIG field includes the EDD.

7. The method of claim 1, wherein the AP is configured to schedule the EDD frame in accordance with a DD scheduling process, the method further comprising, at the STA, sending to the AP a capability information element indicating to the AP a request by the STA to participate in the DD scheduling process.

8. The method of claim 7, wherein the capability information element includes a field to indicate the request by the STA to participate in the DD scheduling process.

9. The method of claim 8, wherein the field to indicate the participation of the STA in the DD scheduling process is a one-binary digit field.

10. The method of claim 8, wherein obtaining an earliest due date (EDD) from a STA comprises obtaining from the STA a frame having a MAC header containing the EDD.

11. The method of claim 10, wherein the MAC header includes a control field, the control field including the EDD.

12. The method of claim 8, wherein obtaining an earliest due date (EDD) from a STA comprises obtaining from the STA a frame having a PHY header containing the EDD.

13. The method of claim 12, wherein the PHY header includes a SIG field, the SIG field including the EDD.

14. The method of claim 13, wherein the SIG field includes an EHT-SIG field, the EHT-SIG field including the EDD.

15. The method of claim 8, further comprising obtaining a capability element that includes a field for an indicator of low delay.

16. The method of claim 15, wherein the indicator of low delay is a one-bit digit.

17. The method of claim 8, wherein each DD is the sum of an arrival time of a frame to the buffer, and a delay parameter DP.

18. The method of claim 8, further comprising, obtaining from the STA, a capability element that includes a field for an indicator of low delay.

19. The method of claim 1, wherein each new frame has a respective DD which is equal to an arrival time of the new frame at the buffer plus a delay parameter.

20. The method of claim 19, wherein each new frame is generated by an application, the method further comprising, at the STA, for each new frame, defining a value of the delay parameter in accordance with at least one of:
a maximum delay value set by the application that generated the new frame;
an average delay value associated with the application; and
a duty cycle of the application.

21. A method, comprising, at an access point (AP) coupled to stations (STAs), each STA having a buffer:
obtaining due dates (DDs) from different STAs, each DD being associated with a respective frame; and
scheduling the AP obtaining the respective frames in accordance with the DDs.

22. The method of claim 21, wherein obtaining the due dates from the different STAs is preceded by the AP obtaining, from each of the different STAs, a respective capability information element indicating that the respective STA is requesting to be scheduled according to the due date of the frame.

23. The method of claim 22, wherein obtaining the respective capability information element includes obtaining a MAC frame containing the capability information element or obtaining a PHY frame containing the capability information element.

24. The method of claim 21, wherein scheduling the respective frames in accordance with the due dates comprises:
comparing the DDs to each other to order the DDs; and
scheduling the frames in accordance with an order of the DDs.

25. A system comprising:
an access point (AP);
stations (STAs) coupled to the AP, each of the STAs having a respective buffer, each of the STAs being configured to:
obtain a new frame and a due date (DD) of the new frame;
compare the DD of the new frame against DDs of previous frames stored in the buffer, to identify the earliest DD (EDD) between the DD of the new frame and the DDs of the previous frames, a frame among the new frame and the previous frames that has the EDD being an EDD frame; and
provide the EDD to the AP for the AP to schedule obtaining the EDD frame from the STA.

26. The system of claim 25, wherein the AP scheduling the EDD frame includes the AP:
comparing the EDD of the EDD frame with one or more other EDDs obtained from other respective STAs; and
scheduling obtaining the EDD frame in accordance with the one or more other EDDs obtained from the other respective STAs.

* * * * *